Aug. 30, 1949.                C. G. COMPTON                2,480,396
              AUTOMATICALLY CONTROLLED INTERRUPTER CIRCUIT
                           Filed Feb. 17, 1948

INVENTOR.
CHARLES G. COMPTON
BY
A1TY

Patented Aug. 30, 1949

2,480,396

UNITED STATES PATENT OFFICE 2,480,396

AUTOMATICALLY CONTROLLED INTERRUPTER CIRCUIT

Charles G. Compton, Indianapolis, Ind., assignor, by mesne assignments, to Cornell-Dubilier Electric Corporation, South Plainfield, N. J., a corporation of Delaware Application February 17, 1948, Serial No. 8,991

6 Claims. (Cl. 171—97)

1

The present invention relates to improvements in power supply units, particularly of the vibrator controlled type.

More specifically the invention relates to converters primarily adapted for converting direct current of a predetermined voltage to an alternating current of the same or of a modified voltage and supplying the same to a load.

It is one of the objects of the invention to provide a converter having the above characteristics which will at the same time deliver to the load, in addition to an alternating current, a direct current to thereby permit the operation of different types of apparatus, one requiring alternating current and the other requiring direct current.

A further object of the invention is to provide a converter having the above defined characteristics which will be placed automatically in operation for delivering to the load both types of current upon the closing of the load circuit.

Further objects and advantages of the invention will appear more fully hereafter in the accompanying specification and claims.

Figure 1:
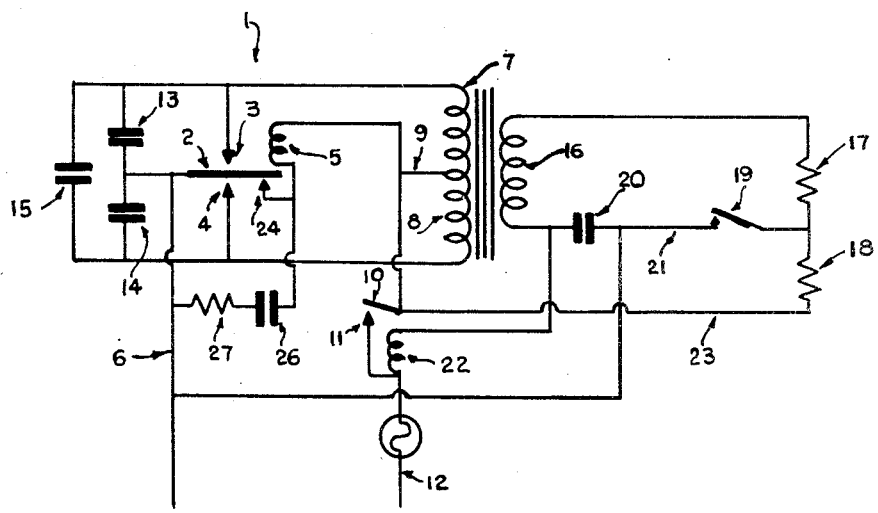
Figure 2:
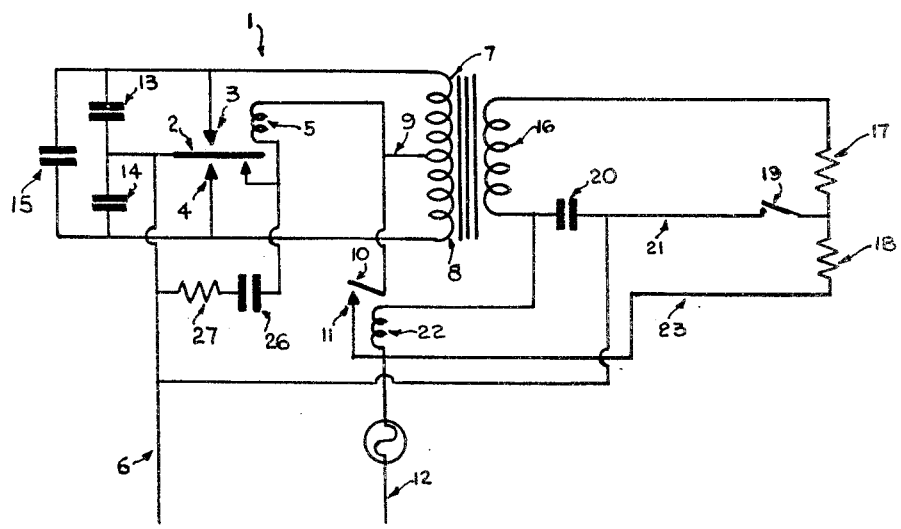

For the purpose of disclosing the invention I have illustrated certain embodiments thereof in the accompanying drawings, in which:

Fig. 1 is a diagrammatic view of circuit arrangement embodying one form of my invention and, Fig. 2 is a diagrammatic view of a modified circuit arrangement embodying my invention.

Referring to the circuit illustrated in Fig. 1 I provide a vibrator interrupter 1 which includes a vibrating reed 2 having suitable contacts thereon, adapted to vibrate between oppositely disposed contacts 3 and 4. The reed is driven by an electromagnet having driving coil 5.

Cooperating with the vibrating interrupter is a transformer having primary winding provided with a pair of coil sections 7 and 8. One terminal of the coil section 7 is connected with the stationary contact 3. One terminal of the coil section 8 is connected with the stationary contact 4. In effect the coil sections 7 and 8 provide a primary winding having a center tap 9. The center tap 9 is connected with a relay switch 10 adapted to cooperate with a stationary contact 11 which in turn is connected to the opposite side 12 of the source of supply through, if desired, a suitable fuse. Suitable buffer condensers 13 and 14 are respectively connected across the stationary contact 13 and the reed 2, and across the stationary contact 4 and the reed 2. An

2 additional buffer condenser 15 is connected across the stationary contacts 3 and 4.

The secondary winding 16 of the transformer is adapted to deliver an alternating current to a load which includes both an alternating current driven apparatus 17 and a direct current driven apparatus 18. To this end one terminal of the secondary winding 16 is connected to one terminal of the A. C. load, while the opposite terminal of the A. C. load 17 is connected through a switch 19 with the opposite terminal of the secondary winding. In series with this switch 19 and the load 17 I also provide a blocking condenser 20. The conductor 21 in which is arranged the blocking condenser 20 and the switch 19 is connected to one side 6 of the direct current source of supply.

The relay switch 10 is operated by operating coil 22 having one terminal connected to one side 12 of the direct current source of supply and the other terminal connected to the conductor 21 between the blocking condenser 20 and the secondary winding 16.

One terminal of the direct current operated apparatus 18 is connected to the conductor 21 through the switch 19 and the opposite terminal is connected by conductor 23 with the switch 10.

The coil 5 of the vibrating reed is connected with a relatively stationary contact 24 normally in contact with the reed 2 and the opposite terminal of this coil 5 is connected to the switch 10. A suppression condenser 26 and suitable resistance 27 is connected across the supply line 6 and the stationary contact 24.

In operation, assuming that switch 19 is open, no current will pass to energize the coil 22. While one terminal of the coil 22 is connected to one side 12 of the supply line and the other terminal of the coil 22 is connected to conductor 21 which conductor is, in turn, connected to the opposite side of the supply line, it is to be noted that the condenser 20 is interposed between the connecting points and this condenser blocks the passage of any direct current through the coil 22. Therefore with the switch 19 likewise open no current will flow to the vibrator converter 1 nor will any direct current flow through the circuit including the direct current apparatus 18. As soon however as the switch 19 is closed a circuit will be established from the side 6 of the direct current supply, across the switch 19 through the load 17 through the secondary winding 16 and through the coil 22 to the opposite side 12 of the direct current source.

With the coil 22 energized the switch 10 will be closed, immediately energizing the driving coil 5 of the vibrating reed. This will move the vibrating reed off its contact 24 and the into engagement with the contact 3 thereby closing a circuit in one direction through the section 7 of the primary winding. The reed having been released by its driving coil 5 will rebound engaging contact 4 and 24 closing the circuit through the primary coil section 8 in the opposite direction and across the switch 10. Accordingly the constant vibration of the reed 2 will deliver direct current to first the coil section 7 in one direction and then the coil section 8 in the opposite direction resulting in the production, in the secondary 16, of an alternating current which will be delivered to the alternating current loads 17. At the same time, with the switches 19 and 10 closed, direct current will be delivered from the source of supply through the direct current load 18, but due to the blocking condenser 20 which will permit the passage of alternating current but blocks the passage of direct current this direct current will in no way affect the operation of the secondary winding and the alternating current load.

In the structure illustrated in Fig. 2 I have shown a modification of the arrangement illustrated in Fig. 1 and in which one terminal of the D. C. load 18 is connected directly to one side 12 of the direct current source of supply, instead of being connected thereto through the switch 10.

I claim as my invention:

1. In an electrical system for supplying direct current and alternating current respectively to direct current and alternating current loads from a source of direct current supply, said system comprising a transformer having a primary and a secondary winding; an interrupter for supplying and interrupting current from said direct current source supply to the primary winding of said transformer and including a driving coil; a direct current circuit including said source of direct current supply, said driving coil and a driving coil switch; an operating coil for said driving coil switch; a direct current circuit independent of said driving coil circuit and including said source of direct current supply and said switch operating coil, a load controlling switch and the secondary coil of the transformer; a direct current circuit including the direct current source of supply, said load controlling switch and a direct current load; an alternating current circuit including the secondary winding of the transformer, said load controlling switch and an alternating current load and a condenser associated with said last two mentioned direct current circuits to prevent passage of direct current therethrough when said load controlling switch is open.

2. In an electrical system for supplying direct current and alternating current respectively to direct current and alternating current loads from a source of direct current supply, said system comprising a transformer having a primary and a secondary winding; an alternating current load circuit including said secondary winding, a load controlling switch and an alternating current load; an interrupter for supplying an interrupted current from said direct current source of supply to said primary winding and including a driving coil; a direct current circuit including said direct current source of supply, said driving coil and a driving coil control switch; an operating winding for said control switch; a direct current circuit, independent of said driving coil circuit including said source of supply, said control switch, a portion of said alternating current circuit, said load controlling switch, the alternating current load and said secondary winding; a direct current load circuit including a portion of said alternating current load circuit, said load controlling switch, a direct current load and said direct current source of supply and a condenser associated with said alternating current circuit and said last two mentioned direct current circuits to prevent passage of direct current through said direct current circuits when said load switch is open while permitting passage of alternating current through said load circuit when said load switch is closed.

3. In an electrical system for supplying direct current and alternating current respectively to direct current and alternating current loads from a source of said current supply, said system comprising a transformer having a primary and a secondary winding; an alternating current load circuit including said secondary winding, a load controlling switch and an alternating current load; a vibrator for supplying an interrupted current from said direct current source of supply to said primary winding and including a driving coil; a direct current circuit including said direct current source and said driving coil; a control switch in said circuit controlling the passage of the direct current through said driving coil and through said primary winding; an operating winding for said control switch; a direct current circuit, independent of said driving coil circuit including said direct current source, said control switch winding, a portion of said alternating current circuit, said load control switch, the alternating current load and the secondary winding of said transformer; a direct current load circuit including a portion of said alternating load circuit, said load controlling switch, a direct current load and said direct current source of supply and a condenser associated with said alternating current load circuit and said last two mentioned direct current circuits preventing the passage of direct current through said circuits when said load switch is open while permitting the passage of alternation current through said load alternating circuit when said load switch is closed.

4. In an electrical system for supplying direct current and alternating current respectively to direct current and alternating current loads from a source of said current supply, said system comprising a transformer having a primary and a secondary winding; a circuit including said secondary winding and an alternating current load, one side of said circuit including a condenser and a load controlling switch and being connected to one terminal of a direct current load; an interrupter for delivering an interrupted direct current to said primary winding from said direct current source and including a driving coil, a direct current supply circuit for said driving coil including a control switch and an operating coil for said switch having one terminal connected to said common lead at one side of said condenser and the opposite terminal connected to one side of said direct current source, the other side of said direct current source being connected to said common lead on the other side of said condenser.

5. In an electrical system for supplying direct current and alternating circuit respectively to direct current and alternating current loads from a source of said current supply, said system comprising a transformer having a primary and a secondary winding; an alternating current load circuit including said secondary winding; a load controlling switch in said circuit, a vibrator for supplying interrupted direct current to said primary winding and including a driving coil; a direct current circuit for said driving coil, a control switch for said circuit; an operating winding for said control switch, a direct current circuit for said operating winding independent of said driving coil circuit and including said load controlling switch; a direct current load circuit including said load controlling switch and a condenser associated with said alternating current circuit, said operating winding circuit and alternating current load circuit preventing the passage of direct current through said operating winding and direct current load circuits when said load controlling switch is open while permitting the passage of alternating current through said alternating current circuit when said load controlling switch is closed.

6. In an electrical system for supplying direct current and alternating current respectively to direct current and alternating current loads from a source of said current supply, said system comprising a transformer having a primary and a secondary winding; an alternating current load circuit including said secondary winding; load controlling switch in said circuit, a vibrator for supplying an interrupted direct current to said primary winding from said alternating current source of supply and including a driving coil, a direct current circuit for driving said coil, a control switch controlling the passage of direct current through said driving coil circuit and the passage of direct current through said primary winding; an operating winding for said control switch, a direct current circuit for said operating winding independent of said driving coil circuit and including said load controlling switch; a direct current load circuit including said load controlling switch and a condenser associated with said alternating current circuit, said operating winding circuit and said direct current load circuit preventing the passage of direct current through said operating winding and direct current load circuits when said load controlling switch is open while permitting the passage of alternating current through said alternating current circuit when said load controlling switch is closed.

CHARLES G. COMPTON.

REFERENCES CITED

The following references are of record in the file of this patent:

UNITED STATES PATENTS

| Number | Name | Date |
|---|---|---|
| 1,475,933 | Carroll | Dec. 4, 1923 |